US007461821B2

(12) United States Patent
Cheng

(10) Patent No.: US 7,461,821 B2
(45) Date of Patent: Dec. 9, 2008

(54) FLEXIBLE TRASH CAN FRAME FOR ENVIRONMENTAL PROTECTION

(76) Inventor: Chung-Chih Cheng, 4F., No. 17, Lane 120, Sinmin St., Danshuei Township, Taipei County 251 (TW)

( * ) Notice: Subject to any disclaimer, the term of this patent is extended or adjusted under 35 U.S.C. 154(b) by 6 days.

(21) Appl. No.: 11/168,373

(22) Filed: Jun. 29, 2005

(65) Prior Publication Data

US 2007/0001063 A1 Jan. 4, 2007

(51) Int. Cl.
*B65B 67/04* (2006.01)
*F16G 3/00* (2006.01)

(52) U.S. Cl. ........................ 248/99; 248/95; 24/30.5 R; 24/31 R

(58) Field of Classification Search ................... 248/95, 248/99, 101; 24/30.5 R, 30.5 S, 30.5 L, 31 R, 24/33 B, 33 K; 186/66
See application file for complete search history.

(56) References Cited

U.S. PATENT DOCUMENTS 3,861,630 A * 1/1975 Ady ........................... 248/100
5,433,406 A * 7/1995 Chavez ........................ 248/99
2007/0001063 A1* 1/2007 Cheng ......................... 248/95

* cited by examiner

*Primary Examiner*—Amy J. Sterling
*Assistant Examiner*—Tan Le
(74) *Attorney, Agent, or Firm*—Lowe Hauptman Ham & Berner, LLP

(57) ABSTRACT

A flexible trash can frame for environmental protection mainly comprises a base, in which a slot is formed at a back side of the base of which an underside is provided with a concave and pivots are provided respectively at top ends of two sides of the base; two pivoting parts are located respectively at two sides behind cover board of which an underside has a buckle buckled to the concave of base; a chute is provided in the guide seat, inside which a flexible belt is accommodated, the guide seat is inserted in the slot of base; after the guide seat is inserted, an insert hole is formed; thus, a front end of the flexible belt is pierced out of the chute and moved round to the insert hole of another side to temporarily wedge into, thereby the flexible trash can frame according to this invention being formed.

6 Claims, 11 Drawing Sheets

FLEXIBLE TRASH CAN FRAME FOR ENVIRONMENTAL PROTECTION

BACKGROUND OF THE INVENTION

1. Field of the Invention

This invention relates to a flexible trash can frame for environmental protection and particularly to a flexible trash can frame for environmental protection with a flexible adjustment belt of which the caliber may be adjusted according to the caliber of various trash bags.

2. Description of the Prior Art

Conventionally, a trash can is almost provided in a house, a vehicle, or a public place for people to dump in; if no trash can is provided, then people arbitrarily dump everywhere so that dirty surroundings will result. Thus, the trash can is indispensable to people in daily life.

Trash cans are divided into large, medium, and small ones in volume and even a desktop trash can; however, general trash cans are covered with hard casings, so the capacity is limited to the casing. When a user wants store the trash can, no effective way is provided for the user to locate it in a preferable space; by contrast, it is very inconvenient to the user. Further, the user generally also places the trash can near a seat in a vehicle, but when the vehicle runs, the trash can is easily turned over because of the vehicle's turn and emergent braking so that it is troublesome to the user to support it with the hand, and there is not enough space provided in the vehicle, so if an extra space is provided for the trash can, the user's moving space is limited. Next, it goes without saying that the trash can in the public place is huge in volume, inconvenient to remove the bag filled with trash, and quite impossible to wash the trash can; by contrast, the unclean trash can affects the urban landscape and puts the urban or public place at which tourists visit to shame.

Thus, it can be seen that the conventional manners none the less has many defects, so it is not a good design to urgently improve.

In consideration of the various defects derived from the conventional manners, this inventor further improves it and finally successfully develops the flexible trash can frame for environmental protection according to this invention after having made extraordinarily painstaking efforts to study the frame for environmental protection diligently with a quiet mind for many years.

SUMMARY OF THE INVENTION

These features and advantages of the present invention will be fully understood and appreciated from the following detailed description of the accompanying Drawings.

This invention provides a flexible trash can frame for environmental protection which does not occupy any space and is featured with easy storage and provided with a flexible adjustment belt of which the caliber may be adjusted according to the caliber of various trash bags and even designed for the bags of different materials to put around, thereby several functions of semi-invisible form, environmental protection, easy storage and the like being achieved in the frame.

The flexible trash can frame for environmental protection comprises a base, a cover board, a guide seat, and a flexible belt, in which a slot is formed at a back side of the base of which an underside is provided with a concave and pivots are provided respectively at top ends of two sides of the base; further, two pivoting parts are located respectively at two sides at the rear side of cover board of which an underside is provided with a buckle and the pivoting part and the pivot of base pivot to each other so that the cover board may be turned and lifted and then buckled to the concave of base with the buckle of cover board; next, a chute is provided in the guide seat, inside which a flexible belt is accommodated, and a push lump is connected with a back end of the flexible belt, through which a user may slide the belt around, and the guide seat is inserted in the slot of base, and after the guide seat is inserted, an insert hole is formed; at this time, only a front end of the flexible belt is pierced out of the chute and moved round to the insert hole of another side to temporarily wedge into, thereby the flexible trash can frame for environmental protection according to this invention being formed.

DETAILED DESCRIPTION OF THE PREFERRED EMBODIMENT

Figure 1:
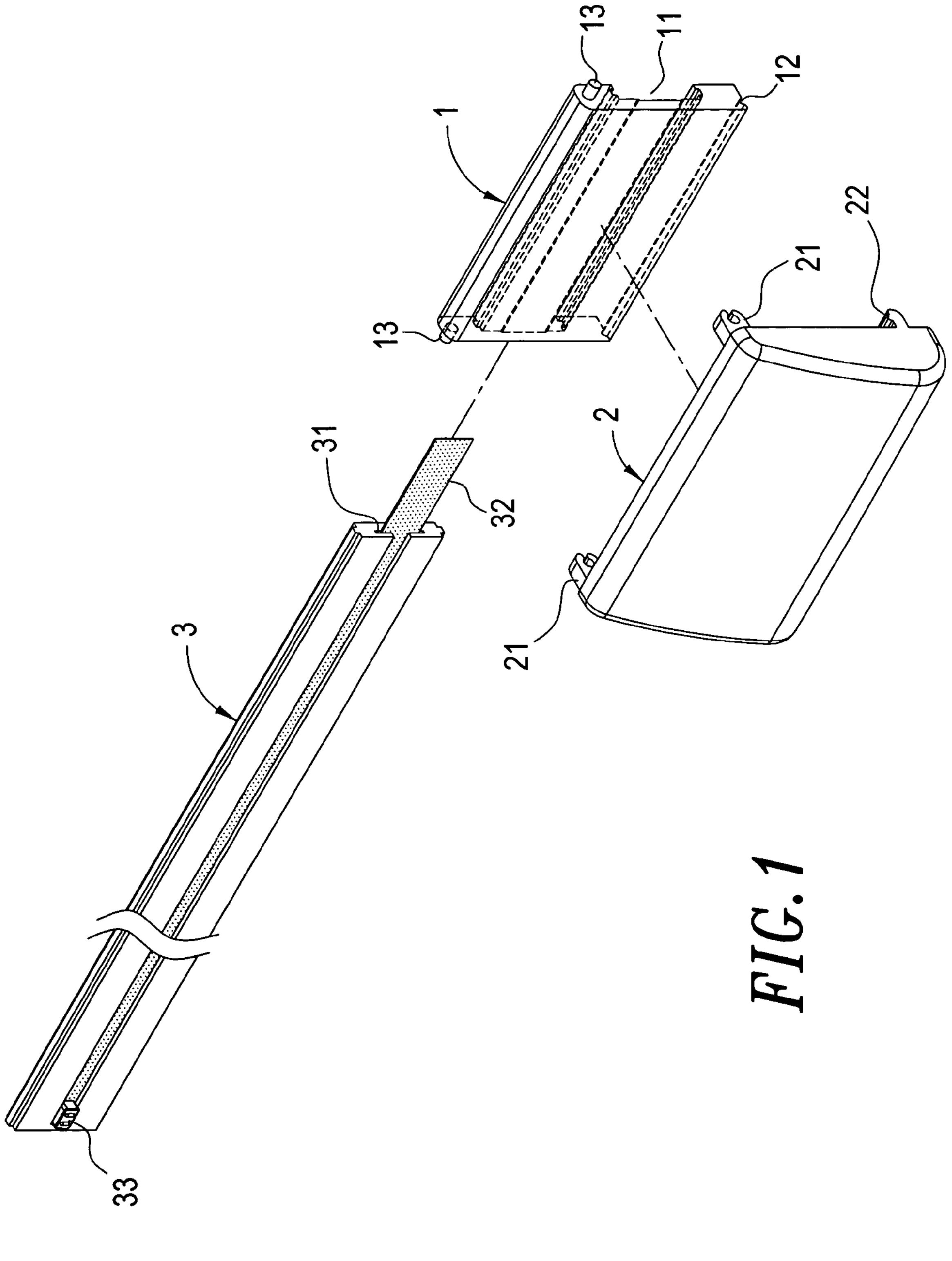
FIG. 1 is a 3D view of a flexible trash can frame for environmental protection according to this invention.
Figure 2:
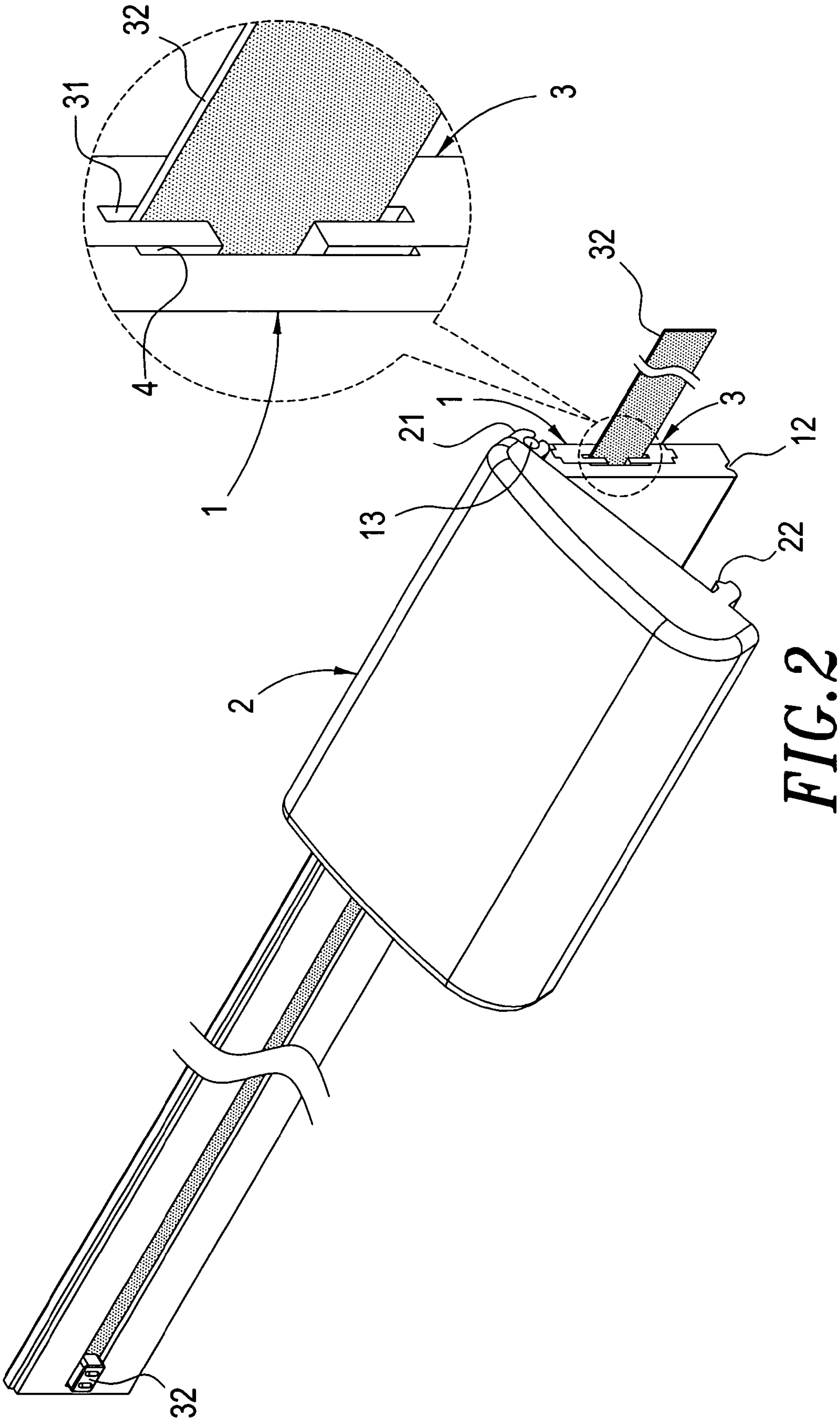
FIG. 2 is a 3D view of connection of the flexible trash can frame for environmental protection according to this invention.
Figure 3A:
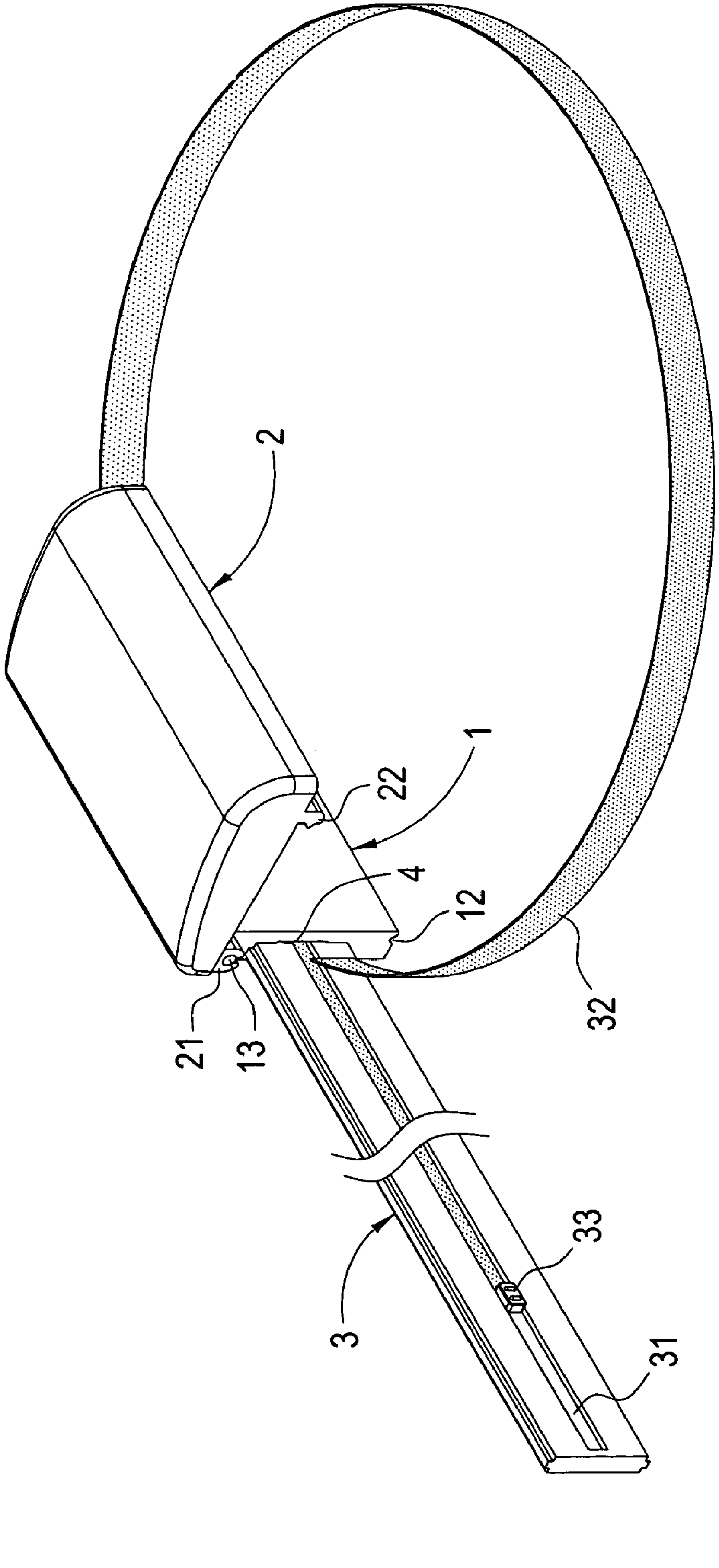
FIGS. 3A, 3B, 3C, 3D, 3E and 3F are schematic views of embodiments of the flexible trash can frame for environmental protection according to this invention.
Figure 3B:
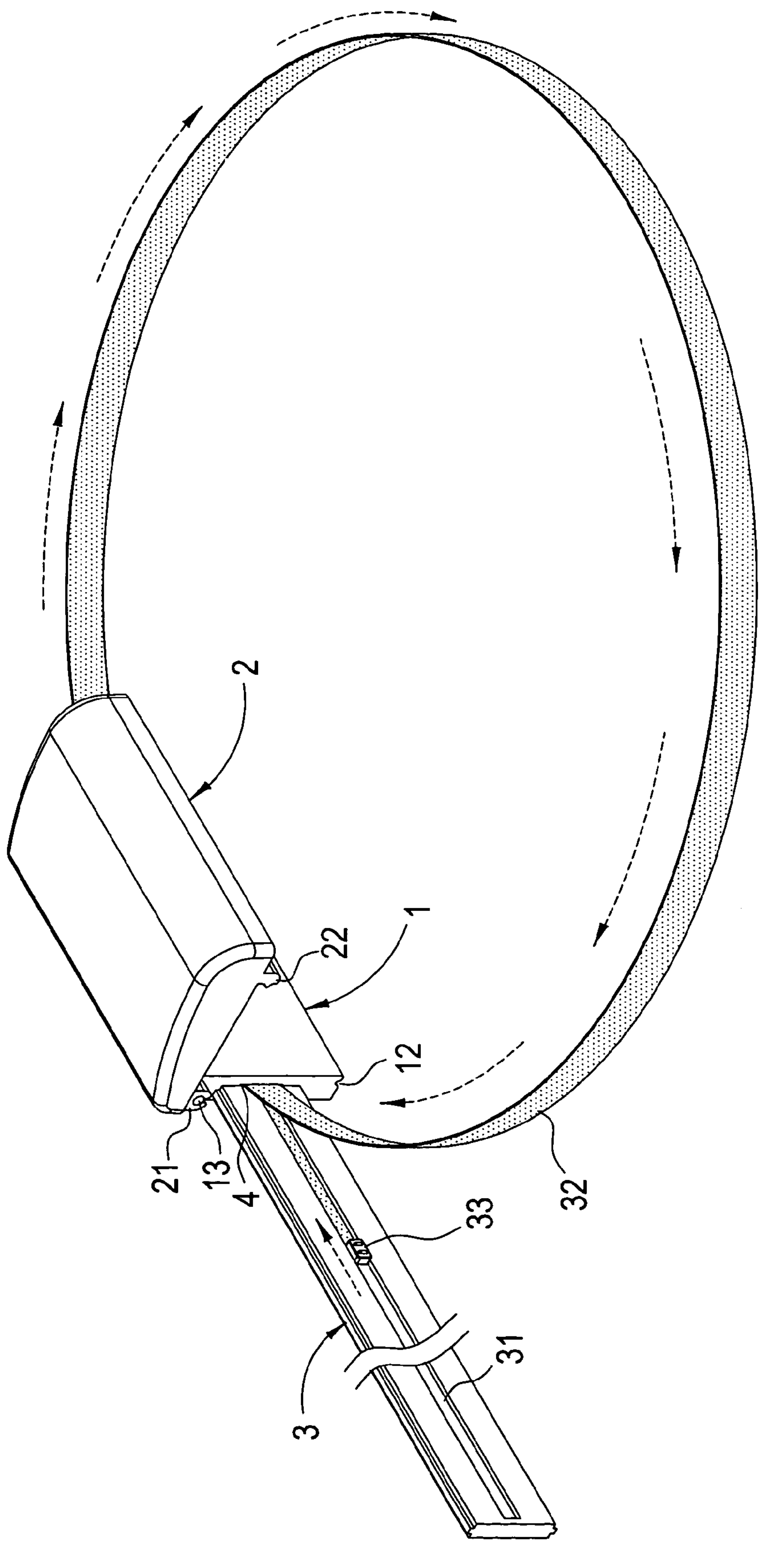
Figure 3C:
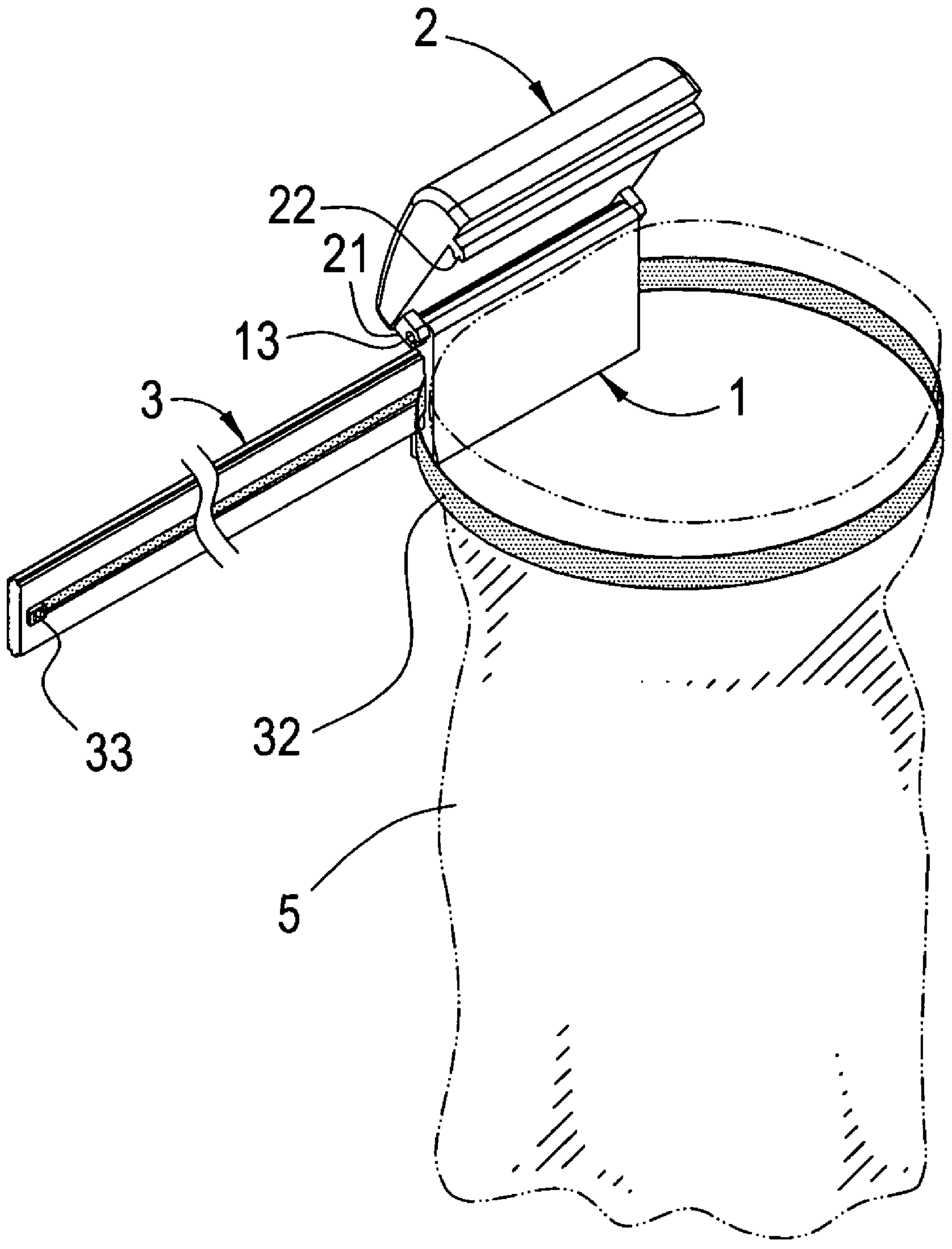
Figure 3D:
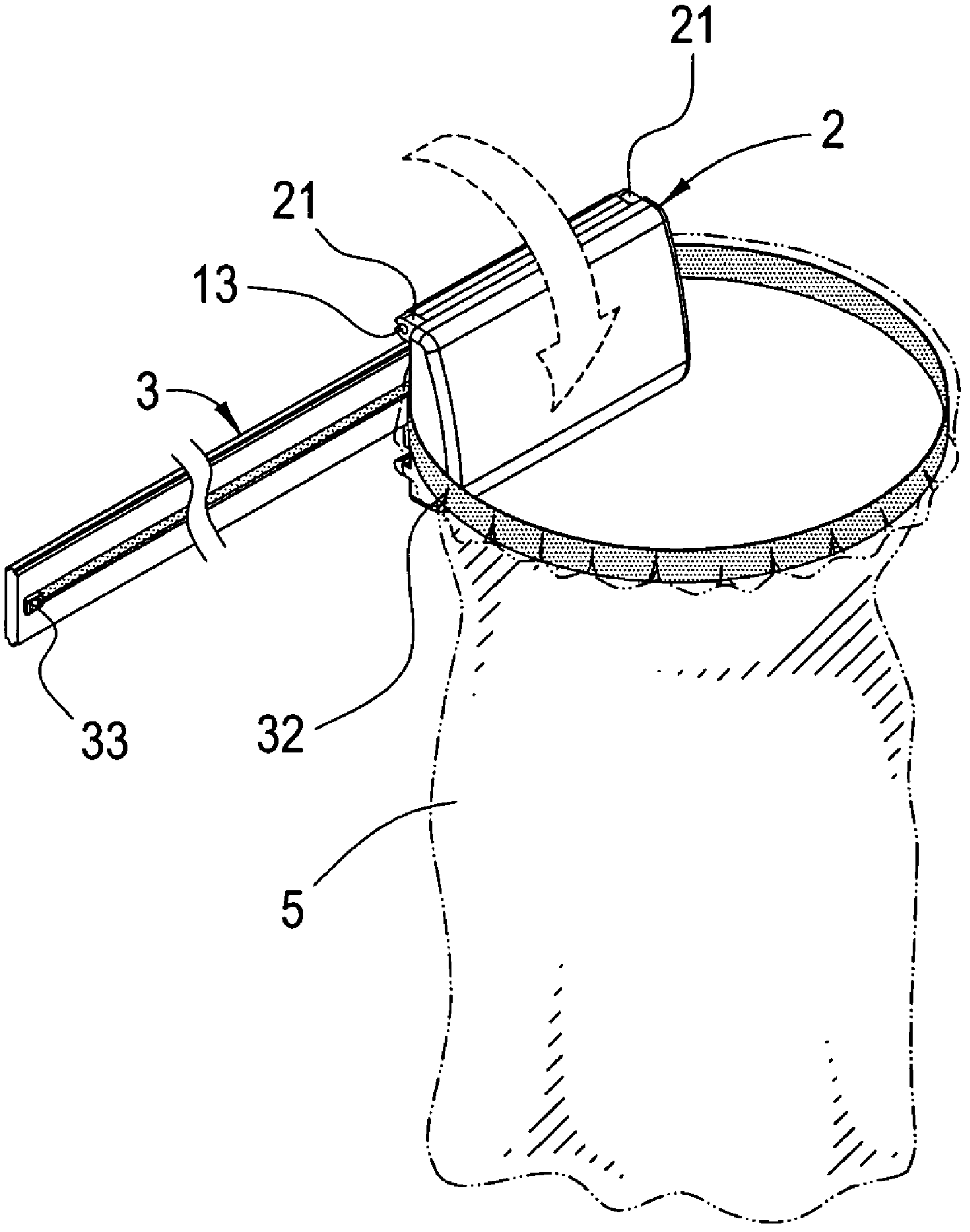
Figure 3E:
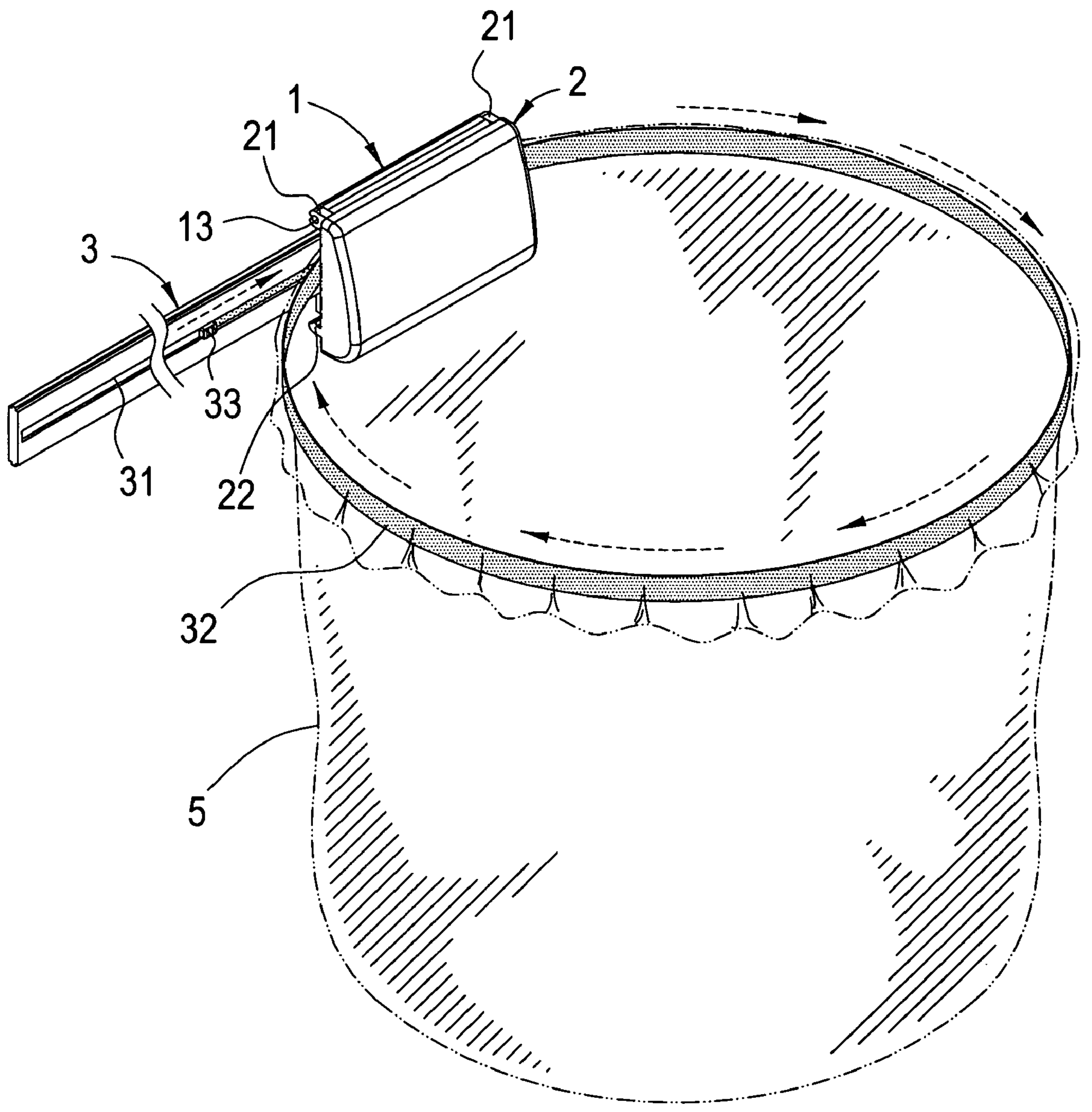
Figure 3F:
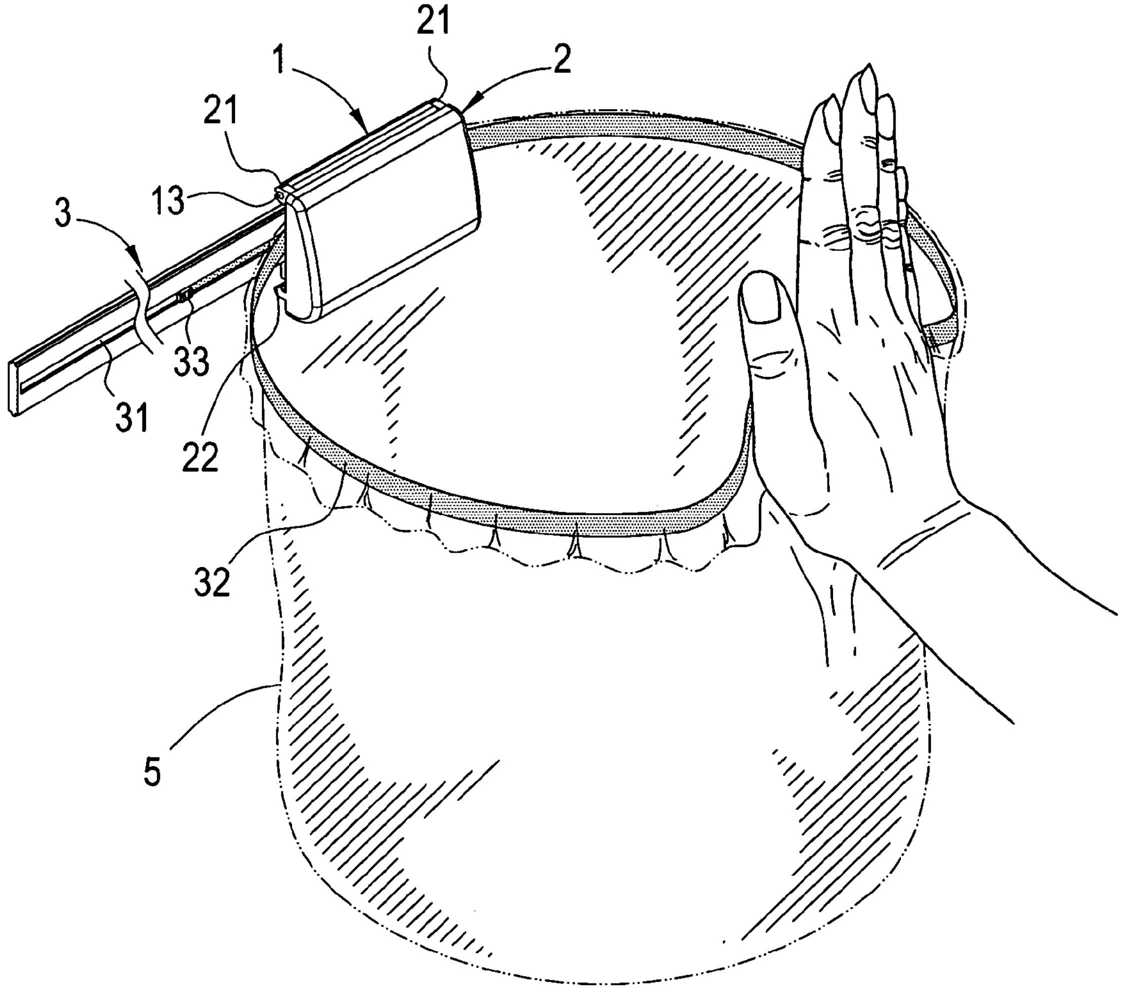

Referring now to FIGS. 1 to 3A~F, a flexible trash can frame for environmental protection according to this invention mainly comprises:

a base 1, in which a slot 11 is formed at a back side of the base 1 of which an underside is provided with a concave 12 and pivots 13 are provided respectively at top ends of two sides of the base 1;

a cover board 2, in which two pivoting parts 21 are located respectively at two sides at the rear side of cover board 2 of which an underside is provided with a buckle 22; the pivoting part 21 of cover board 2 and the pivot 13 of base 1 pivot to each other so that the cover board 2 may be turned and lifted and then buckled to the concave 12 of base 1 with the buckle 22 of cover board 2;

a guide seat 3, in which a chute 31 is provided in the guide seat 3, inside which a flexible belt 32 is accommodated; a push lump 33 is connected with a back end of the flexible belt 32, through which the belt 32 may slide back and forth; the guide seat 3 is inserted inside from a side of the slot 11 of base 1, and after the guide seat 3 is inserted, an insert hole 4 is formed; the belt 32 is flexible and may be bent into that of any shape and randomly transformed with different improper external forces applied without any concern;

After the members are assembled, the frame for environmental protection according to this invention may be stuck in a preferable place, such as a house, a vehicle, a public place and the like. The user pushes out the flexible belt 32 in the guide seat 3, wears it out of the chute 31 of the guide seat 3, and next wears the belt 32 into the insert hole 4. The flexible belt 32 is featured with elastic tension, so the front end of the belt 32 may be wedged into the insert hole 4 with the elastic tension. At this time, after the cover board 2 is uncovered, a part of a bag 5 is lifted to the highest point from the cover board 2 and then pushed down to the buckle 22 of the cover board 2 so that the buckle 22 may fit to and be wedged into the concave 12 of the base 1, the bag 5 being firmly oriented with the cover board 2. After the wedging work, the bag 5 is put around the flexible belt 32 and expanded and contracted according to the caliber of bag 5. Finally, the caliber of belt 32 is adjusted with section-less slip in front and back for a bore diameter to support the bag 5 to be hanged so that the bags 5 of different bore diameters may be put around, thereby the flexible trash can frame for environmental protection according to this invention being formed. The bag 5 may be a plastic bag, a recycled bag, a shopping bag, a paper bag, or a bag to be disposed, and the bag 5 of flat nose or vest shape may be outward turned or not.

Figure 4A:
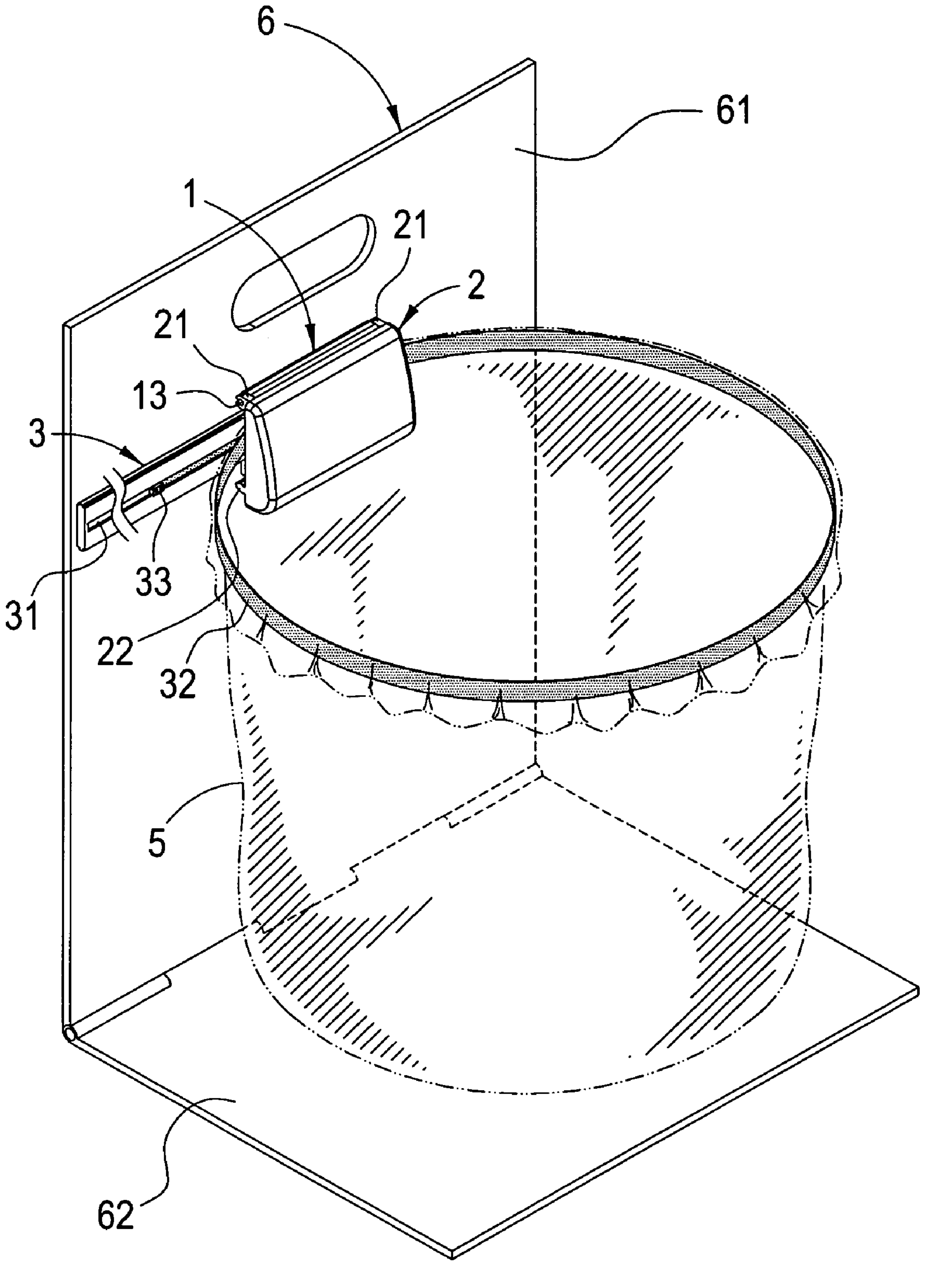
FIGS. 4A and 4B are schematic views of the other embodiments of the flexible trash can frame for environmental protection according to this invention.
Figure 4B:
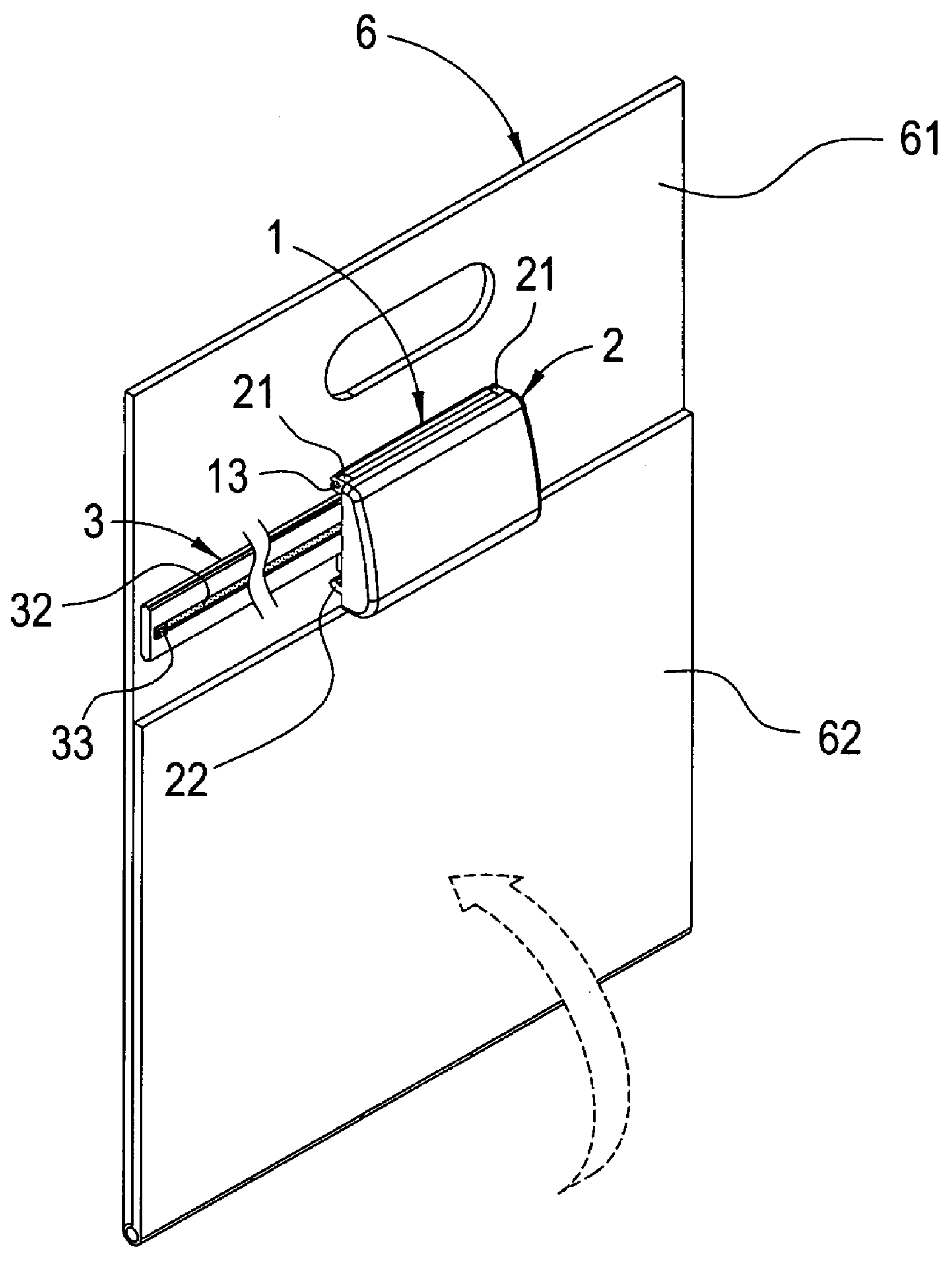

Referring now to FIGS. 4A and B, the flexible trash can frame for environmental protection is illustrated and may be stuck onto an L-shaped folding board 6 pivoted with a support plate 61 and a base plate 62. After the frame for environmental protection is stuck onto the L-shaped folding board 6, the frame for environmental protection may be moved back and forth for adjustment of the caliber of flexible belt 32 according to the caliber of trash bag 5 so that different bags 5 of calibers may be put around the frame. When it is not used, only the belt 32 is required to slip backward to the guide seat 3 and the support plate 61 and the base plate 62 are folded together into a body for easy storage in a random place, thereby the user having extra space to use. Further, it is easy to operate and its whole structure is simple; the capacity of trash meets that of bag, so the user has no concern of waste capacity. Again, when an external force is exerted improperly to this invention, it cannot be damaged and the bag 5 cannot fall off either because the flexible belt 32 may be soft to become deformed with the exerted force without concern of security.

Figure 5A:
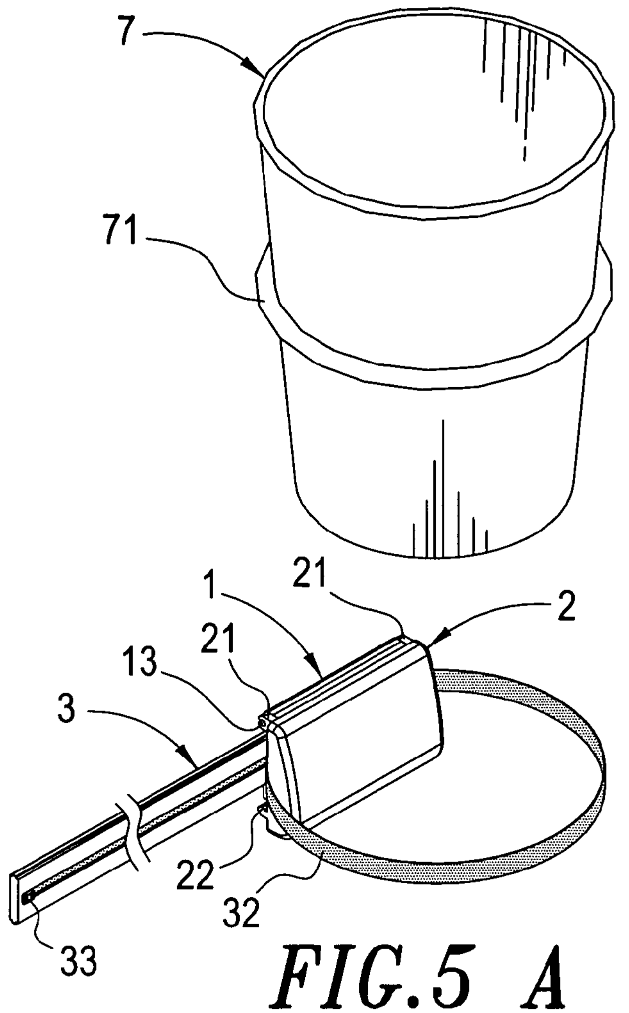
FIG. 5 are schematic views illustrating a flexible belt of the flexible trash can frame for environmental protection according to this invention that is applied with a force.
Figure 5B:
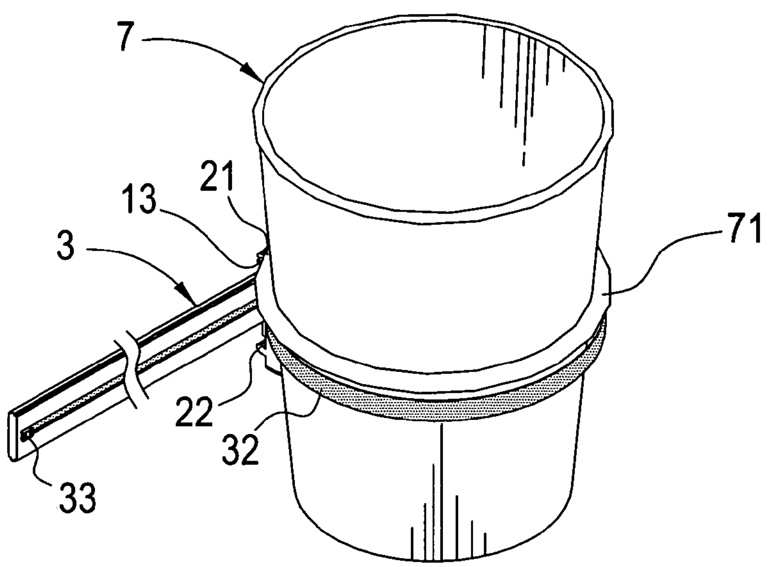

Referring now to FIGS. 5A and B, another embodiment of the flexible trash can frame for environmental protection is described, in which the flexible belt 32 is randomly adjusted, so the belt 32 may be adjusted based on the caliber of an article as a jar. As an example, a cup 7 is taken in this invention, in which a stop ring 71 is put around the cup 7, and then the cup 7 is placed on the belt 32; the stop ring 71 on the cup 7 is stopped by the belt 32 so that the cup 7 may be firmly set on the belt 32 for achievement of the versatile flexible trash can frame; the stop ring 71 may be round, square, or in any shape.

In comparison with the case cited above as proof and other conventional skills, the flexible trash can frame for environmental protection according to this invention further has the following advantages:

Easy operation and simple structure are featured for use in various places, such as a vehicle, a house, a bureau, public camp places on the outskirts, and the like.

The flexible belt of the frame for environmental protection may be randomly adjusted so that various bags may be adjusted properly according to caliber request for the frame.

Similarly, the belt may be randomly adjusted for the cups or jars of different caliber so that the cups or jars may be set on the belt for achievement of versatile use.

The bag generally left after shopping is used as the trash can in the vehicle, the house, or the public place for utility and space saving for storage after use, and thus it is a multi-functional frame for environmental protection to users.

When it is not used, the belt may be shelved in the base and the base and the guide seat occupy a space and a plane surface only, and it will do no harm even if the round belt is not shelved because the belt is deformed with the external exerted force and re-formed after the force is relieved.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A flexible trash can frame, comprising:

a base in which a slot is formed at a backside of the base of which an underside is provided with a concave groove and a plurality of pivots are provided respectively at top ends of two sides of the base;

a cover board and two pivoting parts located respectively at two sides at a rear side of said cover board and a buckle integrally defined by said cover board; the pivoting parts of said cover board pivot about the pivots on said base so that the cover board may be turned and lifted and then buckled to the concave groove of the base with the buckle of the cover board;

a guide seat having a chute inside which a flexible belt is accommodated; the guide seat is located in the slot of the base, and defining an insert hole; and wherein, the flexible belt in the guide seat being pierced out of the chute of said guide seat and then wedged into the insert hole; and the flexible belt adapted to receive a bag having an upper portion folded over the flexible belt with the cover board open and the bag held in place when the cover board is closed and the buckle is wedged into the concave groove.

2. The flexible trash can frame according to claim 1, wherein a push lump is connected with a back end of the flexible belt for pushing back and forth.

3. The flexible trash can frame according to claim 1, wherein the belt is flexible.

4. The flexible trash can frame according to claim 1, wherein the belt is adjustable to accommodate different size bags.

5. The flexible trash can frame according to claim 1, wherein a stop ring is provided around an article thereby the article may be firmly set on the belt.

6. The flexible trash can frame according to claim 1, wherein the bag may be a plastic bag, a recycled bag, a shopping bag, a paper bag, or a bag to be disposed.

* * * * *